Figure 1:
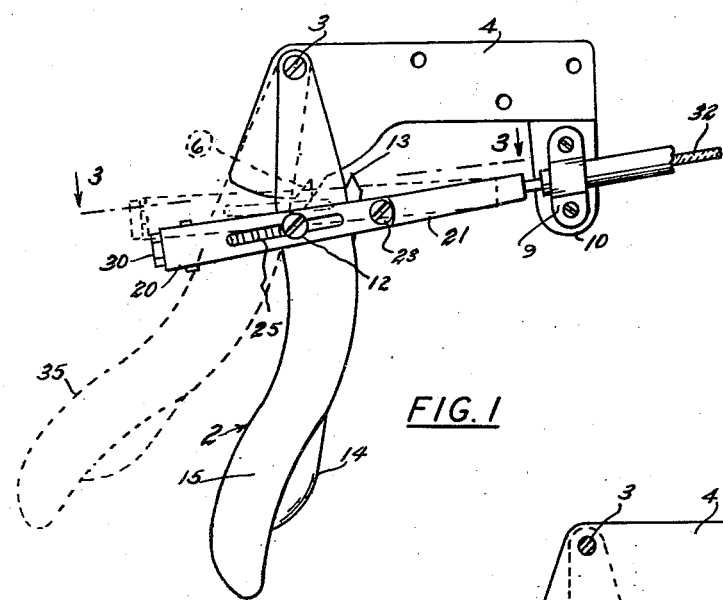

Jan. 13, 1948. E. S. CAMRUD 2,434,548

BRAKE LEVER

Filed June 1, 1945

INVENTOR.
Edwin S. Camrud
BY
Scott H. Norviel, atty.

Patented Jan. 13, 1948

2,434,548

UNITED STATES PATENT OFFICE 2,434,548

BRAKE LEVER

Edwin S. Camrud, Phoenix, Ariz.

Application June 1, 1945, Serial No. 597,007

1 Claim. (Cl. 74—537)

This invention relates to brake mechanism for automobile hand brakes.

In automobile construction, hand brake levers are usually connected to the emergency brake are customarily placed under the cowl. These are pivoted at the top and extend down below the instrument board to a position where they can be easily grasped by the operator. The brake lever is held in set position by a conventional arcuate ratchet and pawl and released by a pawl trip lever within easy reach of the lever handle. The brake lever is connected to a cable which, when pulled by the lever, closes a band brake shoe operative on part of the driving mechanism. This emergency brake is used for the most part to hold the car in position after it is stopped, and in this respect is distinguished from the foot-operated service brakes used to control the speed of the car when in motion.

I have found that operators of automobiles are prone to forget to release these emergency brakes after setting them for the reason that the brake is usually set up or tightened only enough to hold the car from rolling, and the resistance of the brake thus partially engaged is not at once apparent when the car is again driven. When operated with the brake partially engaged, as stated, the brake lining is unnecessarily worn, the brake parts are heated and burned, an undesirable amount of wear is forced on all the driving mechanism and fuel is wasted.

It also often happens that the operator, intending to disengage the brake, releases the pawl, and lets the lever swing forward thinking the brake is fully released whereas the pawl reengages the ratchet and holds the lever at a position where the brake is partially engaged. The undesirable results are the same. Numerous efforts have been made to improve the ratchet and pawl structure of these brakes but so far no practical remedy has been produced.

In view of the foregoing, one of the objects of my invention is to provide a brake lever structure, combined with attendant parts, which will securely lock the brake when actuated, and will fully open the brake when released.

Another object is to provide a brake operative structure which will function to hold the brake closed with adequate resiliently applied force when the brake lever is moved to setting position and will entirely release and open the brake, eliminating all drag, when the brake lever is released from setting position.

Still another object is to provide a brake lever for automobile emergency brakes having a pawl operative on a latch having but a single tooth to retain the lever in set position, and a resiliently operating clevis connecting the lever to the brake cable or rod, together with means for adjusting the tension applied to the cable or rod when the lever is moved to setting position.

A still further object is to provide a resiliently applied take-up for emergency brakes which will compensate for wear.

Other objects will appear hereinafter.

Figure 2:
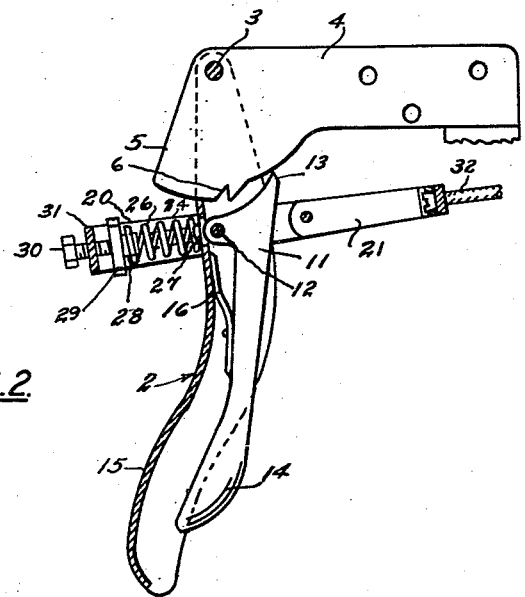
Figure 3:
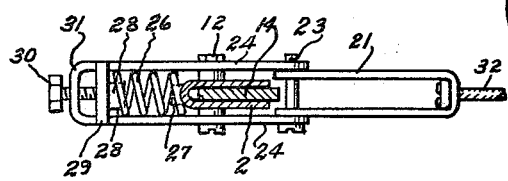

I attain the foregoing objects by means of the devices hereinafter described and illustrated in the accompanying drawings, in which, Figure 1 is a side elevation of a brake lever assembly incorporating my improvements;

Figure 2, an elevational view thereof with the lever and clevis parts sectioned off to show interior structure;

Figure 3, a horizontal sectional view thereof with the section taken substantially on line 3—3 of Figure 1.

Similar numerals refer to similar parts in all the views.

It is to be understood that in the form here illustrated my improved devices are particularly applied to a common form of top-pivoted depending brake lever.

In the drawings, 2 indicates a brake lever pivoted on a bolt 3 to a supporting bracket 4, which is attached to the automobile body.

At the left or rear part of the bracket, a vertical plate portion 5 forms a latch plate which has the single latch notch 6, and which takes the place of the usual ratchet teeth.

At the forward or right end of the bracket, there is a lug 10 which supports the cable guide clamp 9.

Lever 2 is preferably made of stamped sheet metal having, for the most part, a U-shaped section. Within the fold of the lever the pawl 11 is positioned and formed so that it pivots on bearing bolt 12 which extends transversely through and beyond the flanks of the lever. The pawl prong 13 and its release lever 14 are made of one piece of material, with the lever 14 protruding forward from the grip portion 15 of lever 2. A spring 16 maintains the pawl in engaging position.

Lever 2 is embraced by a U-shaped clevis 20 which opens toward the right and is fastened to cable clevis 21 by a pinned joint 23. The arms 24 of clevis 20 are slotted at 25 to receive the ends of bearing bolt 12 with a sliding fit.

Within the left or closed portion of clevis 20 there is an open compression spring 26, which is maintained in position by a lug 27 on lever 2, and by a lug 28 on a slidable tension adjustment plate 29. The position of this plate can be adjusted by screw 30 threaded into the web 31 at the left end of the clevis. As this plate is moved to the right, the compression on spring 26 is increased. The resultant tension on cable 32 can be increased when the lever is pulled to locked position as indicated by dotted outline, 35, Figure 1.

In operation, the bracket is installed in the usual manner. In released position, as shown by the solid lines, Fig. 1, lever 2 is retained in its right-hand position by the tension of brake actuation cable 32. It is well known to the art that band brakes of this type are provided with a spring to normally keep them open. One side of the brake band is anchored and the other attached to the brake cable or rod. The opening spring is usually sufficient to maintain an adequate pull on this cable. If not, further springs are added. Therefore, lever 2 is normally held to the right, with the right end of clevis 21 abutting guide clamp 9.

When the lever is pulled to the left, pawl prong 13 may engage the latch notch 6. To set the brake, the operator grasps the entire grip portion 15 of the lever, including the pawl release lever 14. After pulling the lever to the position indicated by outline 35, the pawl lever may be released by the fingers and the pawl set in the latch notch 6. In this position, the cable 32 is pulled sufficiently to set the brake, and the several actuating parts are adjusted accordingly.

When set, tension is applied to spring 26 and this, in turn, resiliently maintains a proportional tension on clevis 20 which is transmitted through the cable to the brake band. The resilient tension as applied to the brake-band takes care of any usual wear on the band.

The tension applied to the brake cable may be adjusted by taking up screw 30 until, when the lever is in set position 35, the brake band is set tightly enough to hold the automobile or truck against rolling. Obviously, when the lever is released, there is no drag whatever applied to the brake by the brake-band. The brake is either entirely on, or entirely off.

I claim:

A braking device for motor vehicles having a cowl, a band brake with a spring normally maintaining said brake disengaged, and an operative pull cable, comprising in combination, a bracket adapted to be attached to said vehicle cowl; a brake lever having a handle at its lower end pivotally mounted thereon and depending therefrom having a pawl and a pawl releasing lever adjacent said handle; a single detent radially positioned on said bracket, relative to the pivotal mounting of said brake lever, adapted for engagement of said pawl; a U-shaped clevis with its sides embracing said brake lever, having slots cut along said sides; a bearing bolt extending transversely through said brake lever slidably engaging said clevis in said slots; means for attaching the open end of said clevis to said brake pull cable; and an open spring operative between the arms of said clevis bearing at one end against said brake lever and at the other against a plate adjustably secured to the web of said clevis by a longitudinally operative screw therein, whereby the tension of said spring against said brake lever may be varied.

EDWIN S. CAMRUD.

REFERENCES CITED

The following references are of record in the file of this patent:

UNITED STATES PATENTS

| Number | Name | Date |
| --- | --- | --- |
| 1,490,707 | Moses | Apr. 15, 1924 |
| 2,240,783 | Jandus | May 6, 1941 |
| 2,264,005 | Pennington | Nov. 25, 1941 |